UNITED STATES PATENT OFFICE.

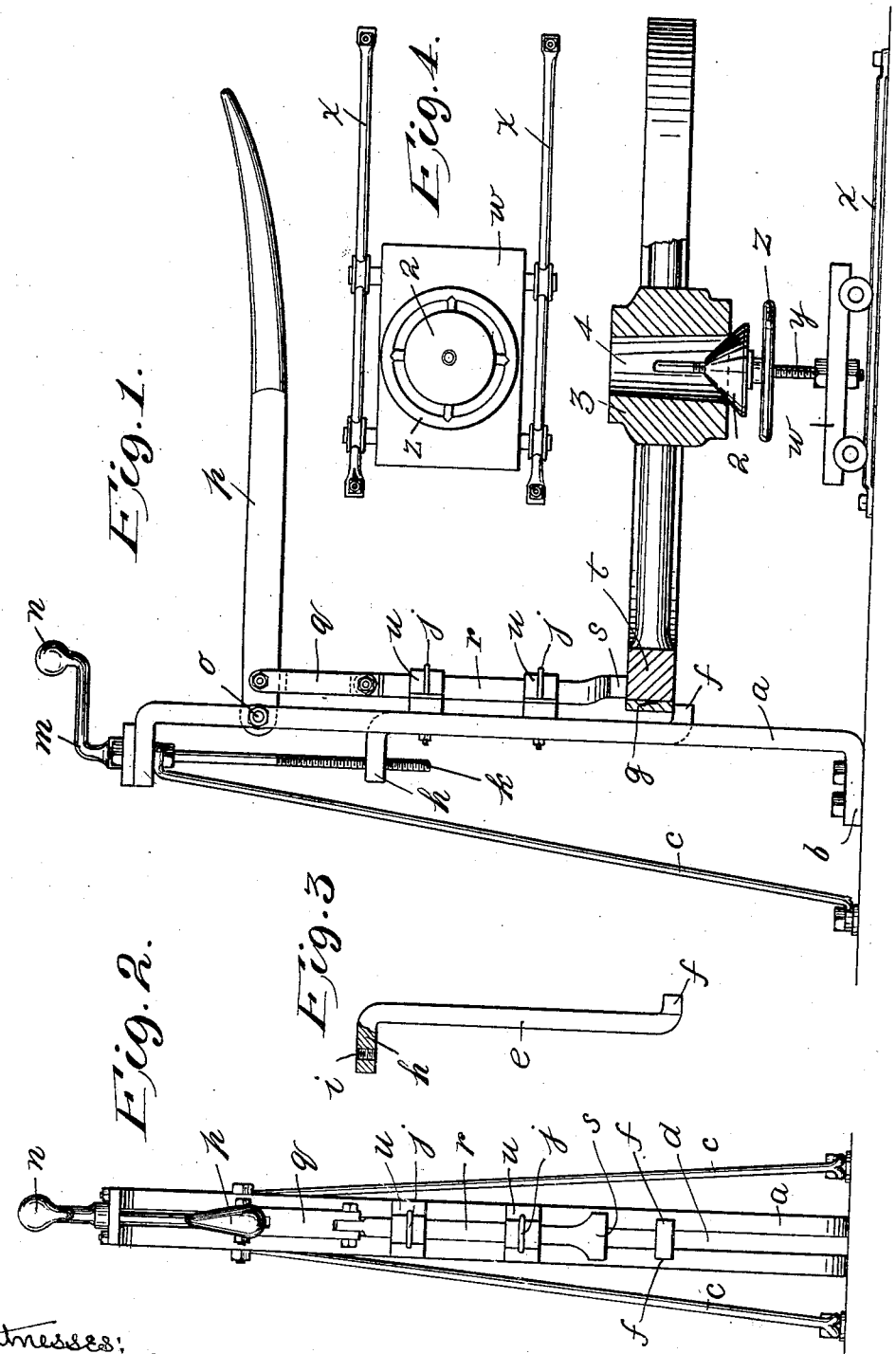

WILLIAM F. HUBBARD, OF BAKERSFIELD, CALIFORNIA.

TIRE-REMOVER.

No. 903,820.     Specification of Letters Patent.     Patented Nov. 10, 1908.

Application filed March 30, 1908. Serial No. 424,052.

*To all whom it may concern:*

Be it known that I, WILLIAM F. HUBBARD, a citizen of the United States, residing at Bakersfield, in the county of Kern and State of California, have invented certain new and useful Improvements in Tire-Removers, of which the following is a specification, reference being had to the accompanying drawings.

My invention relates to improvements in devices for separating the felly of a wheel from the tire thereof; and an object of my invention is to provide a device of this character which will be simple in construction, cheap in manufacture and highly efficient and durable in use.

In the drawings illustrating the principle of my invention and the best mode now known to me of applying that principle, Figure 1 is a side elevation; Fig. 2 is a front elevation, the wheel support being shown removed; Fig. 3 is a detail of the adjustable tire-supporting bar; and Fig. 4 is a plan of the wheel support.

The standard or pedestal $a$ rests upon a foot or base $b$, is suitably braced, as by the brace-rods $c$, and is formed with a central slot or guideway $d$. In the latter is slidably mounted the tire-supporting bar $e$ which is bent forwardly at its lower end and rearwardly at its upper end. The lower end of the bar $e$ is further formed with laterally-extending lugs $f, f$ which bear against the front face of the pedestal $a$ and prevent the bar's being forced rearwardly by the thrust of the tire $g$, which rests upon the step or cross-bar made up of the lower end of the bar $e$ and the lugs $f, f$ (Figs. 1, 2 and 3).

The upper end $h$ of the tire-supporting bar $e$ is formed with a threaded hole $i$, through which passes the lower end of an adjusting screw $k$ which is mounted in the top of the pedestal and the upper end of which is provided with a crank-arm $m$ having a handle $n$ by which the screw $k$ may be turned to raise and lower the tire-supporting bar $e$ to accommodate wheels having different widths of tire.

Fulcrumed at $o$ in the standard $a$ is an operating lever $p$ connected by a link $q$ to the upper end of a felly push-bar $r$ the lower end of which is formed with a presser foot $s$ adapted to rest upon the felly $t$. The felly push-bar $r$ is mounted free to slide through guide-bands or straps $u$ which are fastened to the standard $a$ by the clips $j$.

The wheel is supported by the wheeled platform $w$ which travels upon the rails $x$, and from near the center of which rises a threaded post $y$. The latter is engaged by the hand-wheel $z$ above which is mounted the cone 2. Upon the latter rests the hub 3 of the wheel; and by turning the hand-wheel $z$, the wheel may be raised and lowered. Further, the cone 2 is adapted to enter central holes 4 of various sizes. By moving the car $w$ towards and away from the foot $b$, wheels of various diameters may be operated upon.

The wheel will be mounted upon the cone 2 and the step $f$ will be brought below the tire $g$ by means of the screw $k$ so as to support the tire. Force is then applied to the free end of the lever $p$ and the push-bar is forced downwardly against the felly $t$, whereby the latter is loosened and separated from the tire. The wheel will be rotated from time to time to bring a new part of the felly $t$ below the presser-foot $s$.

It will be observed that the adjusting device $k$ is supported by the standard $a$ and is entirely independent of the operating lever $p$. This brings the stresses upon the parts designed to resist them and enables the construction to be simplified. Further the arrangement of parts herein shown contributes greatly to lengthen the life of the tire-remover and to maintain the parts in working order and thereby to lessen the expense bill for repairs.

The push-bar $r$ and the tire-supporting bar are, it will be noted, independent each of the other, an arrangement which contributes to ease of working of these parts.

I claim:

1. A tire-remover consisting of a standard formed with a slot which extends therethrough; an operating lever fulcrumed in said standard; a felly push-bar connected with said lever and mounted free to slide relatively to said standard; a tire-supporting bar slidably mounted in said slot and formed at its lower end with a step which projects forwardly from out of said slot and with ears which extend laterally from said step and bear against the front of said standard, one on each side of the slot therein, said step projecting beyond said ears and said ears being adapted and designed to prevent said tire-supporting bar from being forced rearwardly out of said slot; and an adjusting screw supported in the upper end of said standard and having its lower end in engagement with the top of said tire-supporting bar.

2. A tire-remover consisting of a standard formed with a slot which extends therethrough; an operating lever which is fulcrumed in said standard; a felly push-bar connected with said lever and mounted free to slide relatively to said standard; a tire-supporting bar slidably mounted in said slot and having its ends bent in opposite directions, the lower end extending forwardly from out of said slot to form a step and having ears which laterally extend from said step and bear against the front of said standard, one on each side of the slot therein, said step projecting beyond said ears and said ears being adapted and designed to prevent the lower end of said tire-supporting bar from being forced rearwardly through said slot; and an adjusting screw supported in the top of said standard and having its lower end in engagement with the rearwardly-projecting upper end of said tire-supporting bar.

In witness whereof I have hereunto set my hand this 18th day of March, 1908, at said Bakersfield in the presence of the two undersigned witnesses.

WILLIAM F. HUBBARD.

Witnesses:
 EVA J. ROBINSON,
 S. C. LONG.